US011376737B2

(12) United States Patent
Schwarz

(10) Patent No.: US 11,376,737 B2
(45) Date of Patent: Jul. 5, 2022

(54) ARRANGEMENT COMPRISING AN AUTOMATIC MOVEMENT MACHINE AND A DELIMITING DEVICE, DELIMITING DEVICE FOR THE ARRANGEMENT, AND METHOD FOR OPERATING THE ARRANGEMENT

(71) Applicant: Siemens Aktiengesellschaft, Munich (DE)

(72) Inventor: Andreas Schwarz, Kalchreuth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 124 days.

(21) Appl. No.: 16/032,615

(22) Filed: Jul. 11, 2018

(65) Prior Publication Data
US 2019/0015987 A1    Jan. 17, 2019

(30) Foreign Application Priority Data
Jul. 13, 2017    (EP) .................................... 17181206

(51) Int. Cl.
*B25J 9/16* (2006.01)
*B25J 19/02* (2006.01)
*B25J 19/06* (2006.01)

(52) U.S. Cl.
CPC .......... *B25J 9/1676* (2013.01); *B25J 9/1633* (2013.01); *B25J 19/02* (2013.01); *B25J 19/063* (2013.01);
(Continued)

(58) Field of Classification Search
CPC ........ B25J 19/06; B25J 9/1676; B25J 19/063; B25J 19/0075; B25J 9/1674;
(Continued)

(56) References Cited

U.S. PATENT DOCUMENTS 4,132,497 A  *  1/1979  Weller ................... B23Q 11/08
                                                    408/241 G
4,536,690 A  *  8/1985  Belsterling .......... B23Q 1/5462
                                                        318/687
(Continued)

FOREIGN PATENT DOCUMENTS

CN        102371586           3/2012
CN        103085057           5/2013
(Continued)

OTHER PUBLICATIONS

Office Action dated Apr. 6, 2021 issued Chinese Patent Application No. 201810734945.4.

*Primary Examiner* — Jake Cook
*Assistant Examiner* — T. Scott Fix
(74) *Attorney, Agent, or Firm* — Cozen O'Connor

(57) ABSTRACT

A method, a delimiting device and an arrangement that includes an automatic movement machine that has at least one movable element, wherein the arrangement includes a delimiting device for delimiting a working region of the automatic movement machine, where the delimiting device includes at least one delimiting element via which it is possible to prevent the at least one element from overshooting at least one boundary of the working region, and the delimiting device also includes a movement apparatus that is configured to move the at least one delimiting element depending on at least one movement of the at least one movable element such that the at least one delimiting element prevents the at least one movable element from overshooting the at least one boundary.

16 Claims, 2 Drawing Sheets

(52) U.S. Cl.
CPC .............. *G05B 2219/40359* (2013.01); *G05B 2219/50216* (2013.01)

(58) Field of Classification Search
CPC .......... G05B 2219/40359; B05B 12/34; G05D 1/0055; G05D 1/0088; G05D 1/0214; G05D 2201/0211; A01D 34/008
USPC ................ 901/49; 700/255, 247; 74/490.01; 340/686.6; 414/222.02; 307/326; 403/11, 23
See application file for complete search history.

(56) References Cited

U.S. PATENT DOCUMENTS

| | | | | |
|---|---|---|---|---|
| 4,795,957 | A * | 1/1989 | MacNeal, Jr. | B25J 9/1676 200/334 |
| 5,111,591 | A * | 5/1992 | Abramowsky | G01V 8/20 250/221 |
| 5,245,885 | A * | 9/1993 | Robertson | B25J 15/0009 294/119.3 |
| 5,744,728 | A * | 4/1998 | Suita | B25J 19/063 73/862.542 |
| 5,813,287 | A * | 9/1998 | McMurtry | B23Q 1/5462 74/490.01 |
| 5,909,938 | A * | 6/1999 | Brenner | G01B 5/008 33/503 |
| 6,708,956 | B1 * | 3/2004 | Mangelsen | B23Q 11/08 256/24 |
| 8,272,179 | B2 * | 9/2012 | Mangelsen | F16P 1/00 52/239 |
| 8,584,547 | B2 * | 11/2013 | Sirkett | B25J 19/0091 74/490.01 |
| 9,475,200 | B2 * | 10/2016 | Schlaich | B25J 9/1674 |
| 9,616,566 | B2 * | 4/2017 | Lin | B25J 9/1612 |
| 10,213,923 | B2 * | 2/2019 | Corkum | B25J 9/1651 |
| 2003/0137219 | A1 * | 7/2003 | Heiligensetzer | B25J 19/0091 310/328 |
| 2006/0049939 | A1 * | 3/2006 | Haberer | F16P 3/142 340/541 |
| 2008/0150467 | A1 * | 6/2008 | Hashimoto | B25J 9/1676 318/568.17 |
| 2011/0277581 | A1 * | 11/2011 | Bunsendal | B25J 9/0009 74/490.05 |
| 2012/0022689 | A1 * | 1/2012 | Kapoor | B25J 9/1666 700/255 |
| 2012/0043831 | A1 * | 2/2012 | Sakakibara | B25J 9/1674 307/326 |
| 2013/0110288 | A1 | 5/2013 | Cassano et al. | |
| 2013/0338829 | A1 * | 12/2013 | Schlaich | B25J 19/06 700/253 |
| 2015/0003893 | A1 * | 1/2015 | Ishimori | F16J 3/042 403/11 |
| 2015/0049911 | A1 * | 2/2015 | Doettling | G06T 7/285 382/103 |
| 2015/0217614 | A1 * | 8/2015 | Aoki | F16C 33/20 403/133 |
| 2017/0008177 | A1 * | 1/2017 | Ebihara | B25J 19/0075 |
| 2017/0014997 | A1 * | 1/2017 | Rohmer | B25J 9/1676 |
| 2017/0259432 | A1 * | 9/2017 | Goerbing | B41J 2/175 |
| 2019/0047160 | A1 * | 2/2019 | Weitschat | B25J 19/06 |

FOREIGN PATENT DOCUMENTS

| | | | | |
|---|---|---|---|---|
| DE | 102006044071 | | 4/2008 | |
| DE | 102007037078 | | 2/2009 | |
| DE | 102008004037 | A1 * | 7/2009 | .......... G01B 11/005 |
| DE | 102008019021 | A1 * | 10/2009 | .......... B25J 19/0075 |
| DE | 102012217764 | A1 * | 6/2014 | .......... B25J 15/0019 |
| DE | 102014006169 | A1 * | 10/2015 | .......... B05B 13/0431 |
| DE | 102014221645 | A1 * | 4/2016 | .......... B25J 19/0091 |
| DE | 202015100913 | U1 * | 5/2016 | .......... B25J 19/0075 |
| DE | 102015009048 | | 8/2016 | |
| DE | 102015216665 | A1 * | 3/2017 | .......... B25J 19/0075 |
| EP | 3061578 | | 8/2006 | |
| EP | 2719997 | A2 * | 4/2014 | .......... B05B 12/084 |

* cited by examiner

ARRANGEMENT COMPRISING AN AUTOMATIC MOVEMENT MACHINE AND A DELIMITING DEVICE, DELIMITING DEVICE FOR THE ARRANGEMENT, AND METHOD FOR OPERATING THE ARRANGEMENT

BACKGROUND OF THE INVENTION

1. Field of the Invention

The invention relates to an arrangement comprising an automatic movement machine that includes at least one movable element, comprising a delimiting device for delimiting a working region of the automatic movement machine, where the delimiting device comprises at least one delimiting element by which it is possible to prevent the at least one element from overshooting at least one boundary of the working region and also relates to a delimiting device for the arrangement, and to a method for operating the arrangement.

2. Description of the Related Art

In order to prevent automatic movement machines from overshooting a pre-specified working region when they are operated, it is known to delimit the working region via stationary protection devices, such as security fences or security gates. A cell can be formed around the automatic movement machines via security fences or security gates of this kind, such that injury to people located in the vicinity of the working region can be effectively prevented, for example. In the case of systems with a working region that is open to the surrounding area in regions, protection devices, such as light barriers, light curtains or pressure-sensitive security mats, are often used in order to avoid injury to persons. As soon as people are detected in the working region, the automatic movement machine is stopped as quickly as possible.

SUMMARY OF THE INVENTION

It is an object of the present invention to provide an arrangement, a delimiting device for the arrangement and a method for operating the arrangement, via which arrangement, delimiting device and method overshooting of a boundary of a working region can be counteracted at a particularly early stage.

This and other objects and advantages are achieved in accordance with the invention by an arrangement, a delimiting device and a method, where the arrangement comprises an automatic movement machine that includes at least one movable element, and a delimiting device for delimiting a working region of the automatic movement machine, where the delimiting device comprises at least one delimiting element by which it is possible to prevent the at least one element from overshooting at least one boundary of the working region.

In other words, the delimiting element prevents the at least one movable element from overshooting the at least one region boundary of the working region, for example, as a result of a malfunction of the automatic movement machine or as a result of manual operator control of the automatic movement machine.

The at least one movable element can be moved in a translatory manner and, in addition or as an alternative, in a rotary manner. The automatic movement machine can be configured to automatically execute movements, for example, depending on a pre-specified movement pattern. Here, the at least one movable element can also be moved depending on the prespecified movement pattern. Movement patterns of this kind can be prespecified, for example, within the scope of commissioning steps or sorting steps that are to be performed via the automatic movement machine, to name only a few examples.

In order to counteract the situation of the boundary of the working region being overshot at a particularly early stage, in accordance with the invention the delimiting device comprises a movement apparatus which is configured to move the at least one delimiting element depending on at least one movement of the at least one movable element such that the at least one delimiting element prevents the at least one movable element from overshooting the at least one boundary. With a movement of this kind of the delimiting element, the movable element can be stopped, i.e., delayed (braked), at an early stage by the delimiting element, before the at least one movable element overshoots the at least one boundary of the working region.

The at least one delimiting element and the at least one movable element can preferably be moved in the same direction and, in addition or as an alternative, in several, identical movement directions of movement. In addition, the movement apparatus can preferably be configured to move the at least one delimiting element at a lower movement speed and, in addition or as an alternative, with a lower acceleration than the at least one movable element of the automatic movement machine. The situation of the at least one boundary being overshot can then be prevented in an advantageous manner by the at least one movable element catching up with the at least one delimiting element until there is finally contact between the at least one delimiting element and the at least one movable element. When this contact is made, it is possible, in contrast to stationary protection devices (e.g., security fences or security gates) that are known from the prior art, for the at least one movable element to be braked not only at an early stage but also in a particularly gentle manner.

The invention is based on the finding that, particularly in the case of a highly dynamic automatic movement machine, particularly high movement speeds and, in addition or as an alternative, particularly high accelerations of the at least one movable element occur, where considerable difficulties can be encountered when attempting to stop the at least one movable element in good time before it overshoots the at least one boundary of the working region. In the case of conventional, stationary protection devices (e.g., security fences or security gates), a malfunction in the automatic movement machine may result in an unbraked collision between the at least one movable element and the stationary protection device at a high movement speed, as a result of which considerable damage may occur. An unbraked collision of this kind can be prevented in an effective manner and at an early stage by the present arrangement.

In an advantageous embodiment of the invention, the at least one delimiting element extends beyond the working region at least in one direction of extent of the working region. This is to be understood to mean, in particular, that the delimiting element extends completely beyond the working region in the direction of extent. This is advantageous because, owing to the delimiting element extending so far in this way, overshooting of the boundary of the working region can be counteracted at a particularly early stage and with a low level of expenditure. Here, it is particularly advantageous that it is possible to dispense with movement of the delimiting element in this direction of extent to counteract overshooting of the boundary of the working region. The delimiting element can be configured, for example, in the form of a bar and therefore in a particularly simple manner.

In a further advantageous embodiment of the invention, the at least one delimiting element surrounds the at least one element at least in regions. This is advantageous because overshooting of the boundary of the working region can be counteracted with a particularly small amount of movement of the delimiting element as a result.

The delimiting element can preferably have a closed cross section. With the closed cross section, the delimiting element can prevent the element of the automatic movement machine from overshooting the boundary of the working region at least in a cross-sectional plane of the closed cross section with a particularly low level of expenditure.

The delimiting element can preferably have a polygonal cross section or a round cross section, as a result of which it is possible to surround the element in a particularly simple manner.

In a further advantageous embodiment of the invention, the automatic movement machine is more dynamic than the delimiting device. This is advantageous because, accordingly, the delimiting device exhibits greater dynamic inertia than the automatic movement machine, as a result of which the delimiting device can be subjected to open-loop and closed-loop control in a more simple manner than the automatic movement machine. It is particularly advantageous here that the delimiting device can be monitored more easily than the automatic movement machine by a security controller as a result.

The automatic movement machine can accordingly have a greater maximum acceleration and, in addition or as an alternative, a greater maximum speed than the delimiting device. In other words, the automatic movement machine can comprise, for example, an actuating apparatus which is able to move the element more quickly and, in addition or as an alternative, to accelerate the element more sharply (abruptly) than is possible in the case of movement of the delimiting element.

In a further advantageous embodiment of the invention, the automatic movement machine is formed as a multi-axis robot, in particular as a delta picker. This is advantageous because there are a particularly large number of degrees of freedom with respect to the movement of the at least one element as a result. In this case, the term "multi-axis robot" is understood to mean, in particular, a robot that is provided with a plurality of movement axes. The automatic movement machine can accordingly be formed as a multi-arm robot, where the at least one element can correspond to an arm of the robot or to a tool.

The at least one element can preferably and generally form a free end of the automatic movement machine. If the at least one element, which is formed as a free end of the automatic movement machine, is prevented from overshooting the at least one boundary of the working region by the at least one delimiting element, further movable elements, which are also connected to the element and are in the form of respective joints, for example, such as further arms, of the automatic movement machine can be stopped from overshooting the boundary of the working region by the at least one delimiting element.

In a further advantageous embodiment of the invention, the delimiting device is formed as a multi-arm delimiting robot, in particular as a SCARA robot. This is advantageous because, on account of the different arms of the delimiting robot, it is possible to prevent overshooting of the boundary of the working region in several movement directions. Here, the term "delimiting robot" is understood to mean that the delimiting device can be in the form of a robot by which the at least one movement of the at least one element of the automatic movement machine can be delimited.

The delimiting device can preferably also comprise a Selective Compliance Assembly Robot Arm (SCARA) robot. The movement of a robot of this kind advantageously recreates that of a human arm.

In a further advantageous embodiment of the invention, the at least one delimiting element forms a free end of the delimiting robot. This is advantageous because all of the degrees of freedom with respect to movement of the delimiting robot can be used to delimit the movement of the at least one element of the automatic movement machine as a result.

In a further advantageous embodiment of the invention, the delimiting device is formed as a linear portal. This is advantageous because, as a result, the delimiting device can have a particularly simple construction and overshooting of the at least one boundary of the working region can be suppressed by simple linear movements of the at least one delimiting element. In this case, the delimiting element can, for example, be formed as a bar of the delimiting device, where the bar can be moved in a translatory manner.

It is also an object of the invention to provide a delimiting device for the arrangement in accordance with the invention. Overshooting of the boundary of the working region can be counteracted at a particularly early stage by a delimiting device of this kind.

It is a further object of the invention to provide a method for operating the arrangement in accordance with the invention, where the method comprises at least the steps of a) moving the at least one element, and b) moving the at least one delimiting element depending on the movement of the at least one element, such that the at least one delimiting element prevents the at least one element from overshooting the at least one boundary. The movement of the at least one delimiting element depending on the movement of the at least one element can advantageously prevent the at least one movable element from overshooting the at least one boundary of the working region. Therefore, the automatic movement machine can be reliably monitored and overshooting of the at least one boundary of the working region can be counteracted at a particularly early stage during operation of the arrangement.

The foregoing enables, for example, the automatic movement machine to be set up in a particularly secure manner during operation of the arrangement, i.e., set up of the automatic movement machine to be performed. During this setting-up operation, the at least one movable element can be moved to various points of a movement pattern by manual operator control of the automatic movement machine to teach an assembly sequence, commissioning steps or sorting steps, to name only a few examples.

In an advantageous embodiment of the invention, the movement of the at least one delimiting element during step b) occurs with a reduction in a safety distance between the at least one delimiting element and the at least one element. This is advantageous because, owing to the safety distance between the delimiting element and the element, undisturbed acceleration of the at least one element from a standstill is possible in a particularly simple manner, without contact between the element and the delimiting element already being established here. As a result, individual working steps can be performed in a particularly rapid and unobstructed manner using the element.

In a further advantageous embodiment of the invention, the at least one delimiting element exerts a retention force on the at least one element when the delimiting element reaches the at least one boundary of the working region in order to prevent the at least one element from overshooting the at least one boundary. This is advantageous because the at least one element can be braked particularly rapidly by the retention force. The retention force can be exerted, for example, by the element making contact with the delimiting element as soon as the element reaches the boundary of the working region.

In a further advantageous embodiment of the invention, the at least one delimiting element, when moving during step b) depending on a movement direction of the at least one element, is oriented such that at least a subregion of the delimiting element is located between the at least one element and the at least one boundary in the movement direction. This is advantageous because blocking of the movement of the element by the delimiting element is made possible in a reliable manner as a result. Therefore, for example, in the event of a malfunction of the automatic movement machine, a collision with the delimiting element can be created, where the collision brakes the movement of the delimiting element.

In a further advantageous embodiment of the invention, the movement of the at least one delimiting element occurs at a lower maximum speed and/or with a lower maximum acceleration than the movement of the at least one element. This is advantageous because the delimiting element is therefore moved with a greater degree of inertia than the element of the automatic movement machine. Owing to the lower maximum speed and, in addition or as an alternative, the lower maximum acceleration, the delimiting element is easier to monitor than the delimiting element of the automatic movement machine.

In a further advantageous embodiment of the invention, a collision between a foreign object that is located in the working region and the at least one element is prevented by the movement of the at least one delimiting element. This is advantageous because, therefore, it is possible to respond to the entry of foreign objects, such as persons, into the working region. A particular advantage of this is that the working region (unlike in the case of stationary protection devices which are known from the prior art) is accessible to persons and, in particular, can be open to the surrounding area at the at least one boundary. As a result, for example, a person can move into the working region without a door of a safety gate or of a security fence first having to be opened for this purpose.

To this end, the arrangement can comprise at least one sensor by which the foreign object in the working region can be detected. Depending on the respective sensor data of the sensor, the movement apparatus can move the delimiting element such that the collision between the foreign object and the element is prevented by the delimiting element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will now be explained in more detail with reference to the appended drawings, in which.

DETAILED DESCRIPTION OF THE EXEMPLARY EMBODIMENTS

The exemplary embodiments described in detail below constitute preferred embodiments of the present invention. It should be noted here that the individual features can be realized not only in the described combinations, but also on their own or in other technically meaningful combinations. In particular, combinations with features from the prior art mentioned at the outset are also possible.

Figure 1:
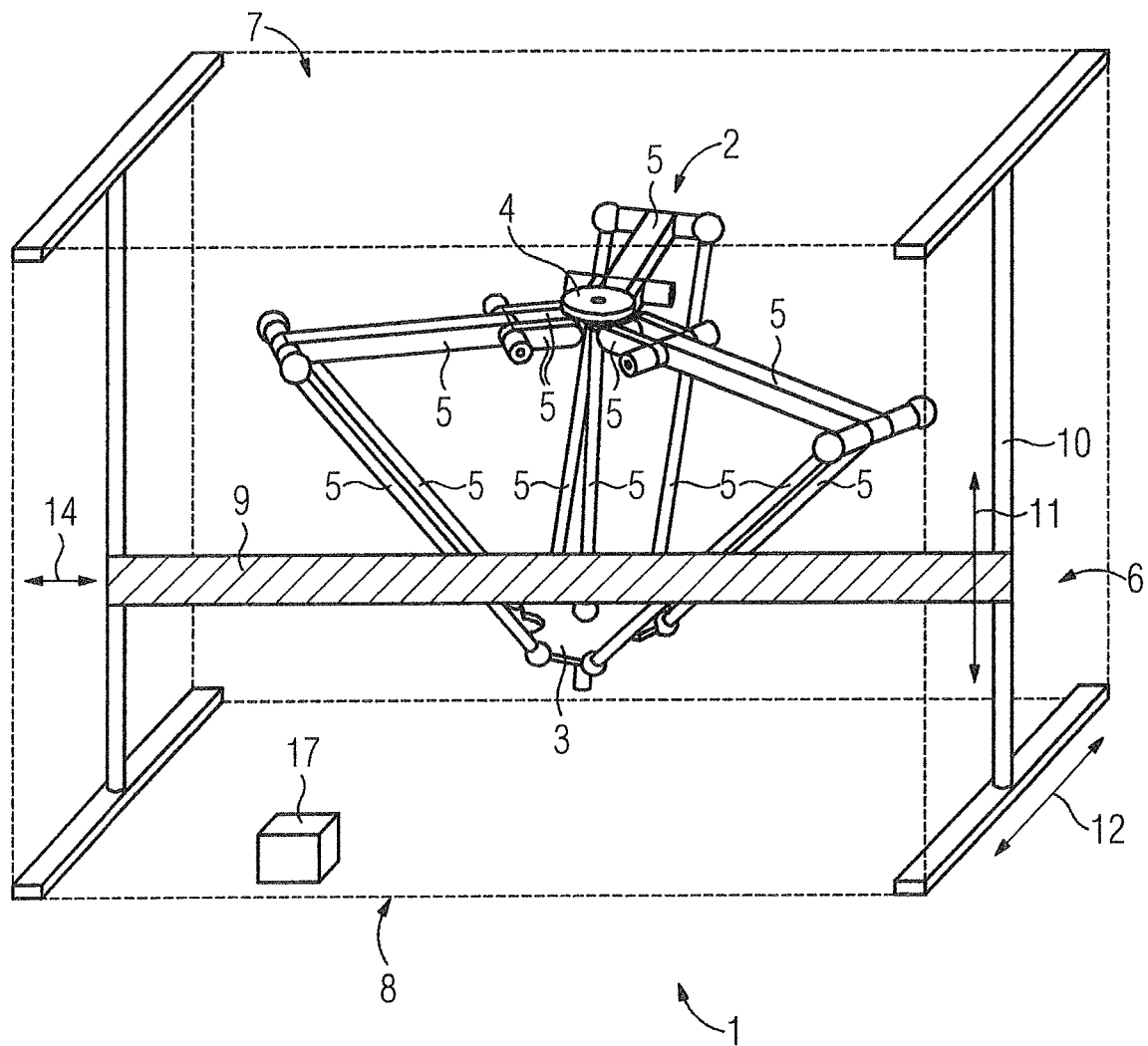
FIG. 1 shows a perspective view of an arrangement comprising an automatic movement machine and a delimiting device in accordance with the invention.
Figure 2:
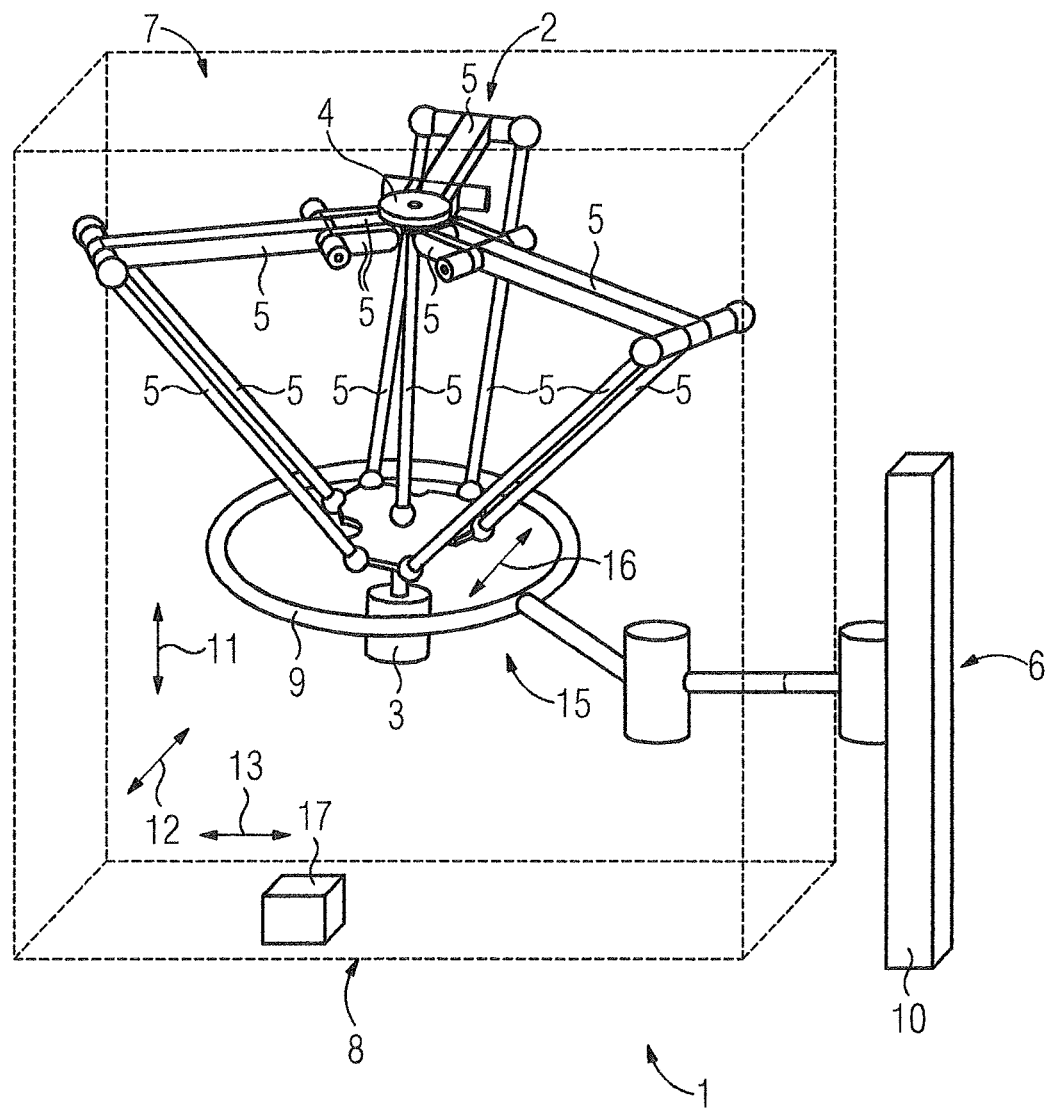
FIG. 2 shows a perspective view of a further embodiment of the arrangement in accordance with the invention.

FIG. 1 and FIG. 2 each show an arrangement 1 comprising an automatic movement machine 2 and also comprising a delimiting device 6 for delimiting a working region 7 of the automatic movement machine 2. In FIG. 1 and FIG. 2, the working region 7 is of cuboidal design merely by way of example; it can therefore also have a different contour.

In the present case, the automatic movement machine 2 is in the form of a delta picker and therefore the form of a multi-axis robot and is more dynamic than the delimiting device 6.

The delimiting device 6 is in the form of a linear portal in the embodiments shown in FIG. 1.

In the embodiments shown in FIG. 2, the delimiting device 6 is formed as of a SCARA robot, i.e., a multi-arm robot.

In the present case, the automatic movement machine 2 comprises a movable element 3, a plurality of arms 5 by which the movable element 3 can be subjected to different movements 11, 12, 13 with respect to the different movement directions, and a base 4 by means of which the automatic movement machine 2 can be mounted in a movable manner, for example, on a room ceiling, not illustrated further here. In the present case, the movable element 3 is formed as a tool, such as a gripping tool. In the present case, the movements 11, 12, 13 are indicated by respective double-headed arrows, where the double-headed arrows demonstrate an ability to move in a bidirectional manner. The respective double-headed arrows can be oriented along respective coordinate axes of a Cartesian coordinate system, not illustrated further here, which is based, for example, on the delimiting device 6.

The movements 11, 12, 13 are indicated by respective double-headed arrows in FIG. 1 and FIG. 2. It is clear in the figures that the movable element 3 can also be subjected to the movements 11, 12, 13 at the same time, so that the movable element 3 can be moved, for example, along individual points of a, for example, arcuate or circular movement pattern.

The delimiting device 6 is provided for delimiting the working region 7 of the automatic movement machine 2, where, in the present case, the delimiting device 6 comprises a delimiting element 9 by which it is possible to prevent the element 3 from overshooting a boundary 8 or a plurality of boundaries 8 of the working region 7. The boundary 8 can correspond, for example, to a side surface of the cuboidal working region 7, illustrated in FIG. 1 and FIG. 2.

The delimiting device 6 can also be configured to protect all of the boundaries 8 of the working region 7 from being overshot by the element 3.

The delimiting device 6 comprises, in general, a movement apparatus 10 which is configured to move the delimiting element 9 depending on the respective movements 11, 12, 13 of the element 3 such that the delimiting element 9 prevents the element 3 from overshooting the boundary 8.

In FIG. 1, the delimiting element 9 is formed as a bar and extends completely beyond the working region 7 in one direction of extent 14 of the working region 7.

In FIG. 2, the delimiting element 9 has a closed cross section. The closed cross section of the delimiting element 9 is formed as an annular cross section and therefore in the form of a round cross section in FIG. 2. As a result, the element 3 completely surrounds the delimiting element 9, as can be seen in FIG. 2.

In the embodiment shown in FIG. 2, the delimiting element 9 forms a free end 15 of the delimiting device 6 which is formed as a delimiting robot in this embodiment.

Figure 3:
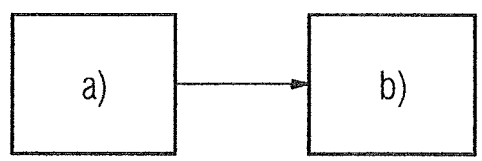
FIG. 3 shows a flowchart of a method for operating the arrangement in accordance with the invention.

In the case of a method for operating the arrangement 1, at least the following steps a), b) are performed, where the steps are schematically illustrated in FIG. 3.

In step a), the element 3 moves.

In step b), the delimiting element 9 moves depending on the movement of the element 3, so that the delimiting element 9 prevents the element 3 from overshooting the boundary 8.

In addition, the movement of the delimiting element 9 in step b) occurs with a reduction in a safety distance 16 between the delimiting element 9 and the element 3. In the present case, the safety distance 16 is indicated by a double-headed arrow in FIG. 2. The safety distance 16 is not illustrated in FIG. 1 only for reasons of clarity.

The delimiting element 9 exerts a retention force on the element 3 when the delimiting element 9 reaches the boundary 8 of the working region 7. Here, the safety distance 16 between the delimiting element 9 and the element 3 is reduced to the value "0" and the delimiting element 9 accordingly bears against the element 3. This prevents the element 3 from overshooting the boundary 8.

The delimiting element 9, when it moves in step b) depending on a movement direction of the element 3, is oriented such that at least a subregion of the delimiting element 9 is located between the element 3 and the boundary 8 in the movement direction.

In the present case, the movement of the delimiting element 9 occurs at a lower maximum speed and, in addition, with a lower maximum acceleration than the movement of the element 3.

In addition, a collision between a foreign object 17 that is located in the working region 7 and the element 3 is prevented by the movement of the delimiting element 9. In the present case, the foreign object 17 is indicated only schematically in FIG. 1 and FIG. 2. The foreign object 17 may be, for example, a person in the working region 7.

The present arrangement 1 allows reliable monitoring of the delta picker 2 (automatic movement machine) even though it has a particularly high acceleration capability. In the case of a potentially dangerous situation in which there is a threat of the at least one boundary 8 of the working region 7 being overshot, the element 3 of the delta picker 2 can be stopped in good time, in particular at an early stage, without safety-related limit values being exceeded.

As a result, it is possible to set up the automatic movement machine 2, for example, in a particularly simple manner and in the process to manually move to individual points of the movement pattern in order to prespecify the movement pattern to the automatic movement machine 2 as a result.

A particular advantage is that, with the delimiting device 6, it is possible to dispense with moving the automatic movement machine 2 in a cell that is physically separate from an operator.

Irrespective of whether the delimiting device 6 is formed as a Cartesian linear portal that is less dynamic than the automatic movement machine 2 (see FIG. 1), i.e., formed as a linear axis system or instead formed as a SCARA robot (see FIG. 2), safe control and also safe operation of the automatic movement machine 2 can be ensured by virtue of using the delimiting device 6.

In the case of the embodiment illustrated in FIG. 1, at least the (e.g., bar-like) delimiting element 9 of the linear portal 6 (linear axis system) can be arranged in the working region 7 to prevent the element 3 from overshooting the at least one boundary 8.

The linear axis system can be monitored by a safety controller with respect to its Cartesian speed and position. Owing to the movement of the delimiting element 9, the working region 7 can be adapted such that, for example, an operator (foreign object 17) can move closer to the automatic movement machine 2 during set-up of the automatic movement machine 2.

For the purpose of automatic operation, in which the automatic movement machine 2 can be operated after the setting-up operation has been performed and in which the automatic movement machine can be protected by conventional protection devices, the delimiting element 9 can also be removed, such that particularly unobstructed movement of the element 3 within the working region 7 is made possible.

The delimiting element 9 constitutes, in general, a movable, mechanical delimiting means for the movable elements 3 and therefore for the automatic movement machine 2, where the delimiting means prevents at least the element 3 from breaking out of the working region 7.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement comprising an automatic movement machine which includes at least one movable element, the arrangement comprising:

a delimiting device which is controlled separately from and moves independently of the at least one movable element and which delimits a working region of the automatic movement machine, the delimiting device including:
  at least one multi-arm delimiting robot which prevents the at least one movable element from overshooting at least one fixed boundary of the working region of the automatic movement machine within which a foreign object and the at least one movable element are simultaneously located and via which contact of an entirety of the at least one movable element with the foreign object located in the working region of the automatic movement machine in which the at least one movable element moves is prevented, and
  a movement apparatus which moves the at least one multi-arm delimiting robot depending on at least one movement of the at least one movable element such that the at least one multi-arm delimiting robot prevents the at least one movable element from overshooting the at least one fixed boundary.

2. The arrangement as claimed in claim 1, wherein the at least one multi-arm delimiting robot extends beyond a working region at least in one direction of extent of said working region.

3. The arrangement as claimed in claim 2, wherein the at least one multi-arm delimiting robot surrounds the at least one movable element at least in regions.

4. The arrangement as claimed in claim 1, wherein the at least one multi-arm delimiting robot surrounds the at least one movable element at least in regions.

5. The arrangement as claimed in claim 1, wherein the automatic movement machine has a lower dynamic inertia than the delimiting device.

6. The arrangement as claimed in claim 1, wherein the automatic movement machine comprises a multi-axis robot.

7. The arrangement as claimed in claim 6, wherein the multi-axis robot comprises a delta picker.

8. The arrangement as claimed in claim 1, wherein the at least one multi-arm delimiting robot comprises a Selective Compliance Assembly Robot Arm (SCARA) robot.

9. The arrangement as claimed in claim 1, wherein the at least one multi-arm delimiting robot forms a free end of the delimiting device.

10. The arrangement as claimed in claim 1, wherein the delimiting device comprises a linear bar.

11. A method for operating an arrangement comprising an automatic movement machine which includes at least one movable element, the method comprising:
  a) moving the at least one movable element; and
  b) moving at least one multi-arm delimiting robot of a delimiting device which is controlled separately from and moves independently of the at least one movable element and which delimits a working region of the automatic movement machine, said movement of the at least one multi-arm delimiting robot being dependent on the movement of the at least one movable element, such that the at least one multi-arm delimiting robot prevents the at least one movable element from overshooting at least one fixed boundary within which a foreign object and the at least one movable element are simultaneously located;
  wherein a collision between the foreign object which is located in a working region of the automatic movement machine in which the at least one movable element moves and an entirety of the at least one movable element is prevented by the movement of the at least one multi-arm delimiting robot.

12. The method as claimed in claim 11, wherein at least the movement of the at least one multi-arm delimiting robot in step b) occurs with a reduction in a safety distance between the multi-arm at least one delimiting robot and the at least one movable element.

13. The method as claimed in claim 12, wherein the at least one multi-arm delimiting robot exerts a retention force on the at least one movable element when said at least one movable element reaches the at least one fixed boundary of the working region in order to prevent the at least one movable element from overshooting the at least one fixed boundary.

14. The method as claimed in claim 11, wherein the at least one multi-arm delimiting robot exerts a retention force on the at least one movable element when said at least one movable element reaches the at least one fixed boundary of the working region in order to prevent the at least one movable element from overshooting the at least one fixed boundary.

15. The method as claimed in claim 11, wherein the at least one multi-arm delimiting robot, when moving during step b) depending on a direction of movement of the at least one movable element, is oriented such that at least a sub-region of the at least one multi-arm delimiting robot is located between the at least one movable element and the at least one fixed boundary in the direction of movement.

16. The method as claimed in claim 11, wherein the movement of the at least one multi-arm delimiting robot occurs at least one of (i) at a lower maximum speed and (ii) with a lower maximum acceleration than the movement of the at least one movable element.

* * * * *